Nov. 22, 1960   J. T. DEWAN ET AL   2,961,641
PULSE HEIGHT ANALYZER APPARATUS
Filed March 19, 1958   5 Sheets-Sheet 4
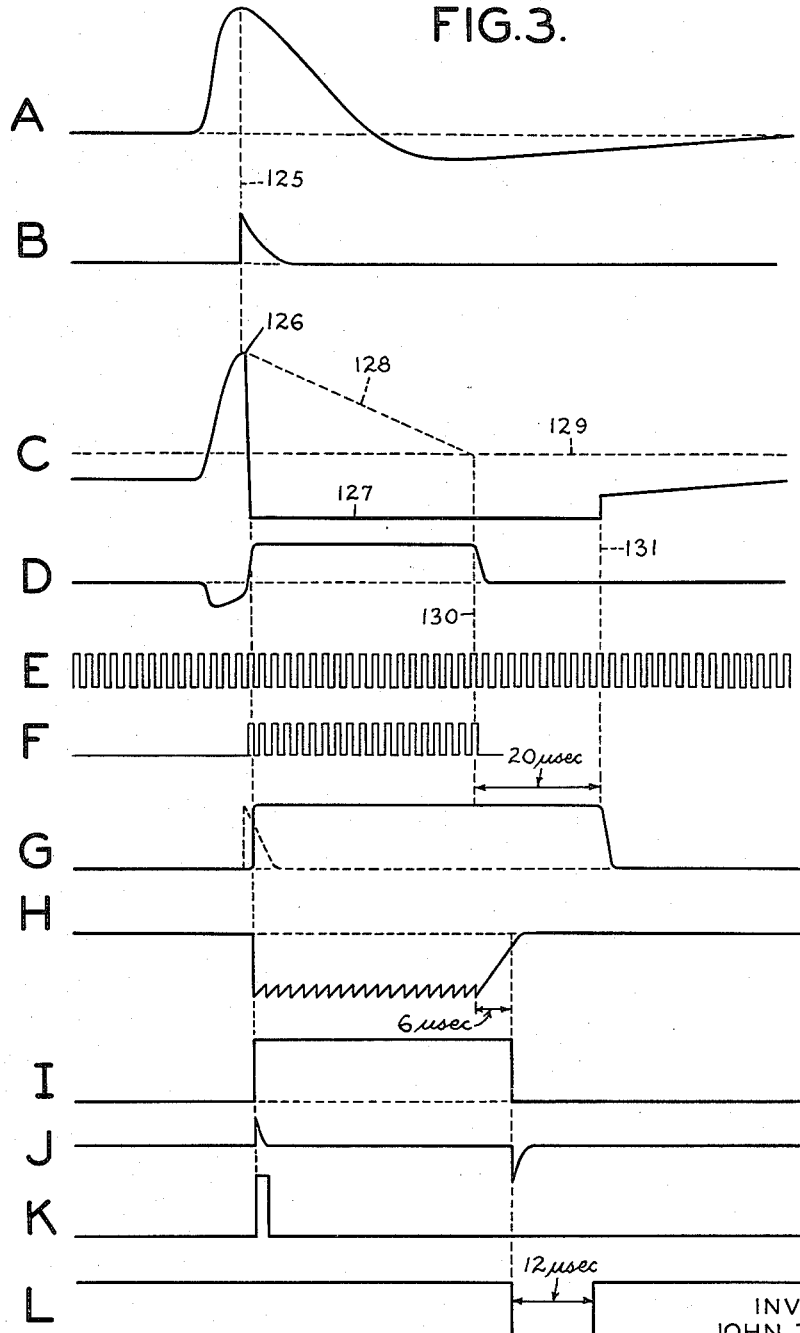
INVENTORS
JOHN T. DEWAN
CHARLES W. JOHNSTON
BY
Brumbaugh, Free, Graves & Donohue
THEIR ATTORNEYS United States Patent Office 2,961,641
Patented Nov. 22, 1960

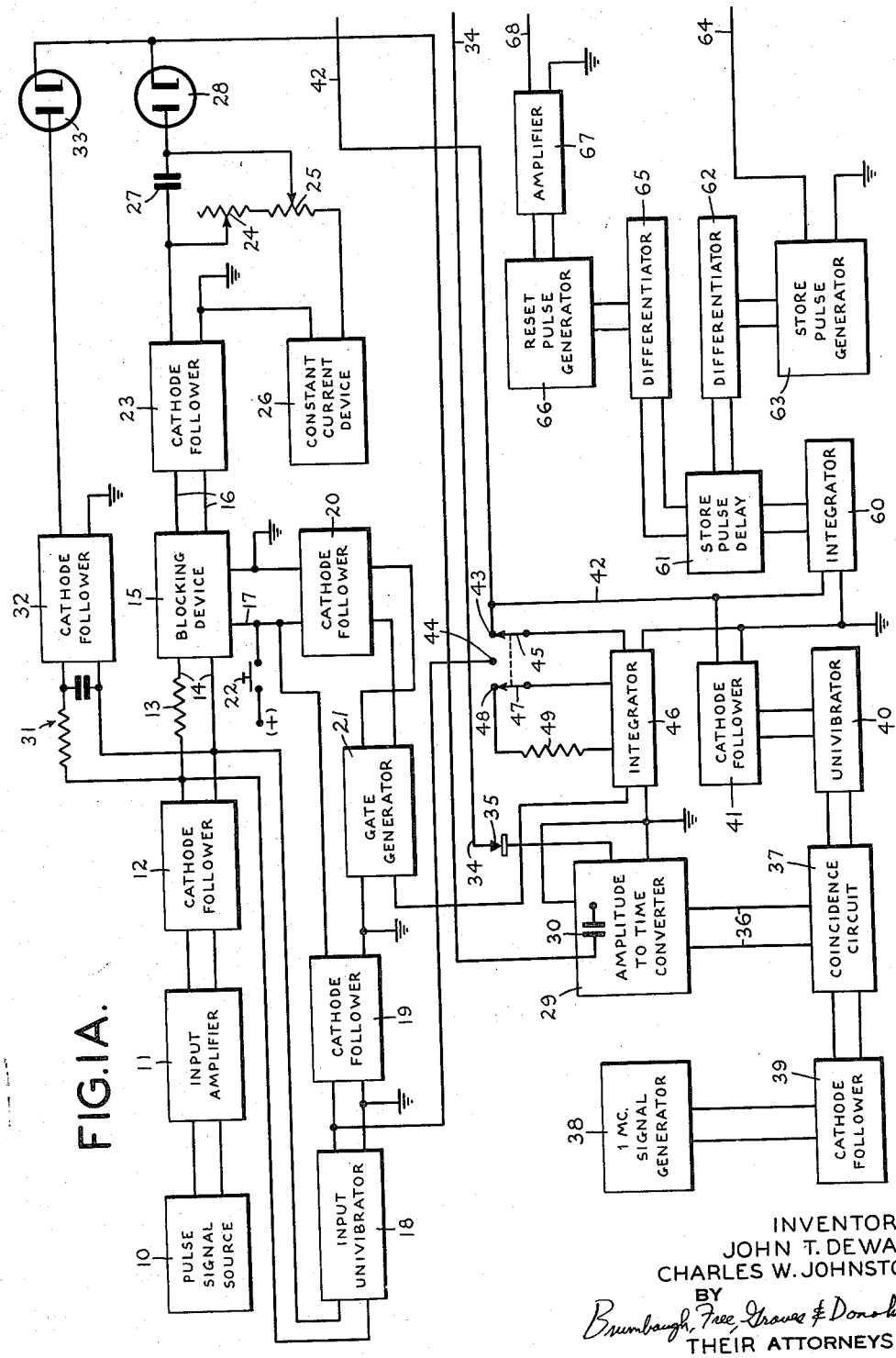

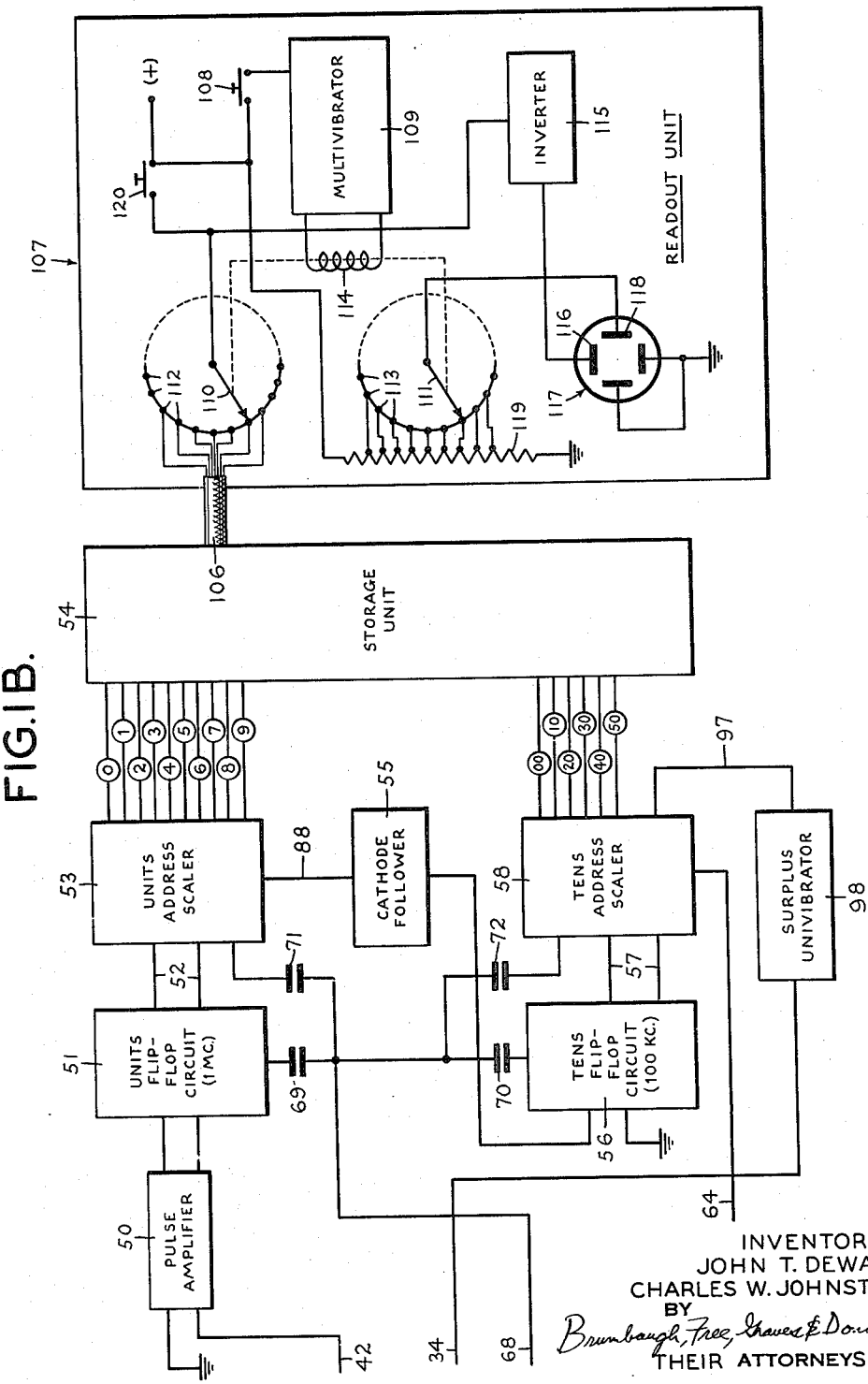

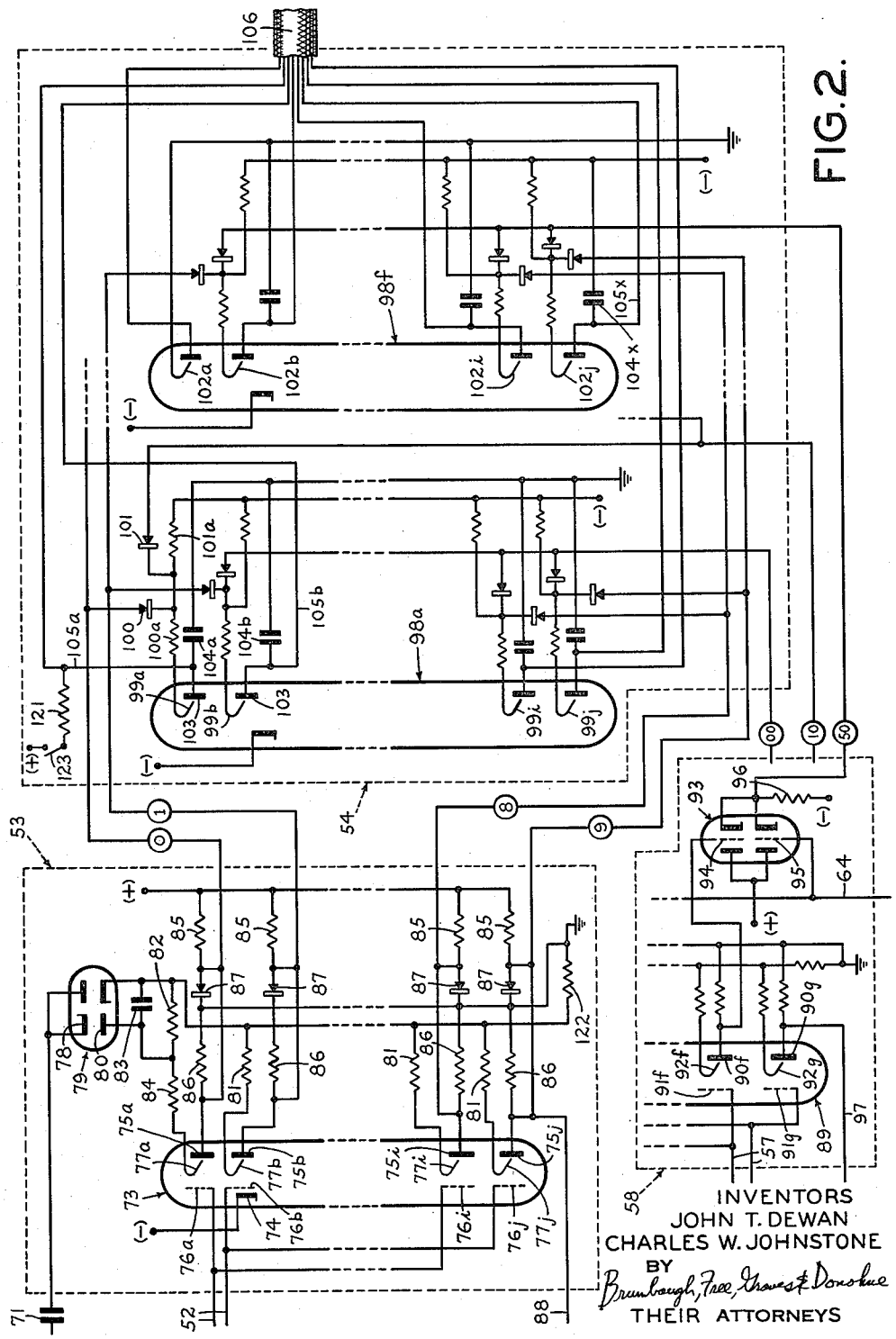

2,961,641

PULSE HEIGHT ANALYZER APPARATUS

John T. Dewan and Charles W. Johnstone, Houston, Tex., assignors to Schlumberger Well Surveying Corporation, Houston, Tex., a corporation of Texas Filed Mar. 19, 1958, Ser. No. 722,601

12 Claims. (Cl. 340—172)

This invention relates to pulse height analyzers and, more particularly, to a new and improved pulse height analyzer for indicating the amplitude distribution of a group of random-amplitude pulses in a signal under analysis.

One type of pulse height analyzer employed heretofore includes an amplitude-to-time converter in which an input pulse of any given amplitude generates an output pulse of predetermined amplitude, having a duration proportional to the amplitude of the corresponding input pulse. By actuating a continuously running oscillator in response to the output pulse, there is produced a series of pulses of standard amplitude and duration whose number is proportional to the given amplitude of the original pulse. This series of pulses is supplied to a scaler to determine an "address" representing the number of pulses in the series and, consequently, the amplitude of the original pulse. A unit signal is then recorded at that address in a storage system comprising a group of message registers corresponding to all possible "addresses," or input pulse amplitude channels, and thereafter the analyzer is reset so as to process another input pulse in the same way. Accordingly, the accumulated totals in the message registers at the end of a unit time interval are representative of the distribution in amplitude of the pulses in the signal being analyzed.

It will be apparent that improved definition of pulse amplitude differences is obtained in an analyzer of the foregoing type by increasing the number of amplitude channels for a given range of amplitudes. However, inasmuch as this requires a greater number of message registers, the complexity and cost of the system are thereby increased and with greater complexity the reliability of the apparatus may be adversely affected.

It is, therefore, an object of the present invention to provide a new and improved signal analyzer which, for a given number of channels, is less complex and expensive than prior arrangements.

Another object of the present invention is to provide a new and improved signal analyzer embodying a relatively simple and economical storage system.

Yet another object of the present invention is to provide a new and improved signal analyzer having a relatively simple count storage system which is highly efficient and reliable in operation.

A further object of the present invention is to provide a signal analyzer featuring generally improved operational characteristics.

These and other objects of the invention are accomplished by providing a pulse sorter including an input circuit adapted to receive a signal having pulses in a range of amplitudes and including a plurality of output circuits for deriving a corresponding plurality of signals, each such signal accompanying a pulse having an amplitude within a particular one of a plurality of portions of the aforesaid range of amplitudes. In order to accumulate signals corresponding to amplitudes detected within the various portions of the range, an electron discharge device including a cathode, a plurality of anodes and a corresponding plurality of control electrodes is arranged with the control electrodes coupled to respective ones of the aforesaid output circuits, a plurality of storage elements being coupled to the plurality of anodes. Also, means are provided for deriving indications representative of the electrical energy stored in the various storage elements.

Further objects and advantages will be apparent from a reading of the following description in conjunction with the accompanying drawings in which:

Figs. 1A and 1B represent schematically, in block form, a typical signal analyzer embodying the present invention;

Fig. 2 illustrates schematically the circuits of certain portions of the analyzer shown in Figs. 1A and 1B; and Figs. 3 and 4 represent various wave forms in the circuit of Figs. 1A and 1B useful in explaining the operation of the signal analyzer there illustrated.

Figure 4:
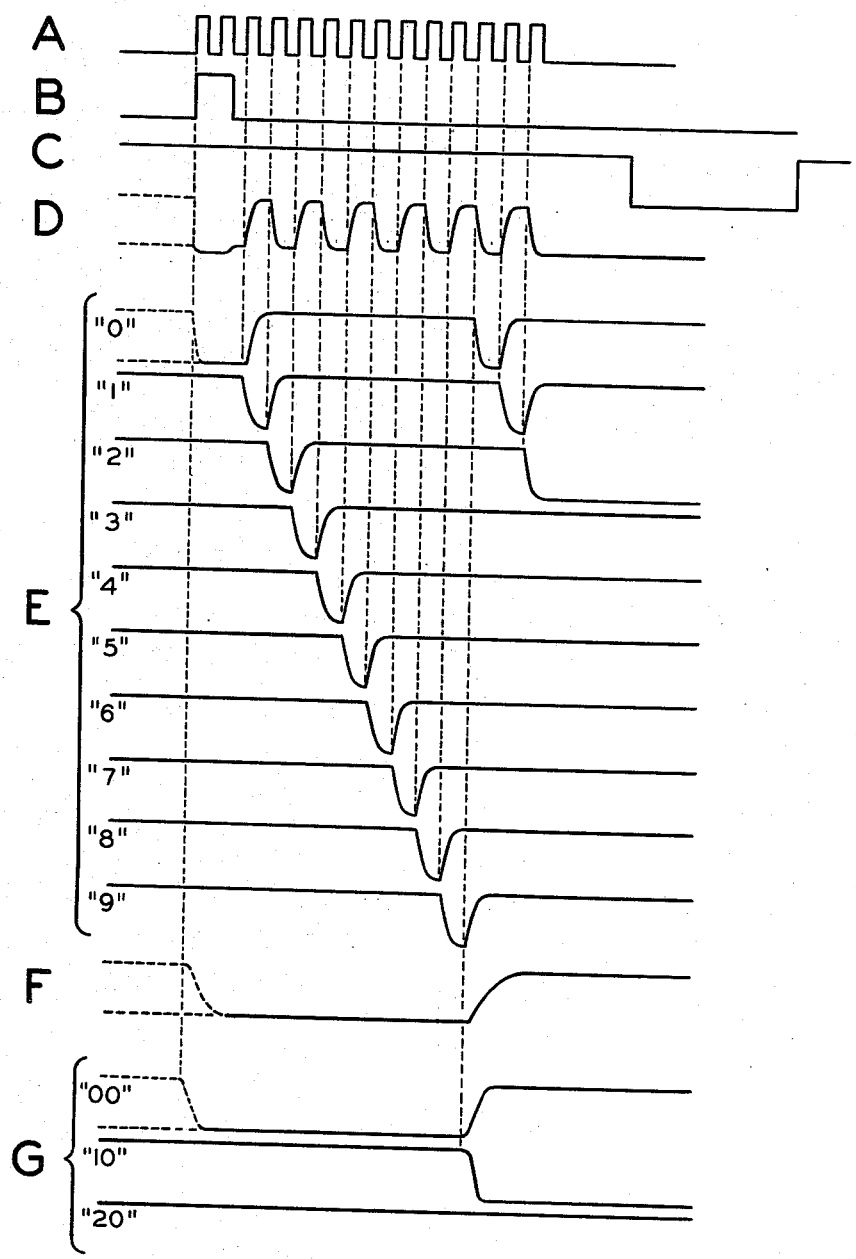

As illustrated in Fig. 1A, a signal analyzer embodying the present invention comprises a pulse signal source 10 supplying a signal consisting of pulses which is to be analyzed for pulse amplitude distribution. Coupled to the source 10 is an input amplifier 11 having an appropriate number of stages to provide amplified pulses which are supplied to a cathode follower 12 which may, for example, be of the type in which the cathode load includes a triode type electron tube, so as to effect a low impedance output circuit. Leading from the cathode follower output a pair of conductors 14 including a series resistor 13 carries pulse signals therefrom to a conventional blocking or clamp device 15 which normally passes applied signals to its output leads 16. However, application of positive voltage to a control lead 17 lowers the impedance of device 15 to a value much less than that of the resistor 13 thereby interrupting the signal path to the leads 16. As an example, the blocking device may include a triode electron tube having the resistor 13 in its plate circuit and the line 17 connected to its grid, the cathode being grounded.

In order to activate the blocking device 15 rapidly, the cathode follower 12 is coupled to an input univibrator 18 constructed in any well-known manner to be insensitive to positive signals but extremely sensitive to negative signals so as to provide an output pulse when the peak in the signal source pulse applied to the univibrator occurs, driving a cathode follower 19 to supply a sharp positive voltage peak to the line 17. In addition, another cathode follower 20 coupled to the lead 17 receives blocking signals from a gate generator 21, which is controlled in a manner to be described hereinafter. Also coupled to the line 17 is a stop-start switch 22 leading to a source of positive potential so that when the switch is closed, device 15 is blocked. Suffice it to say, the circuit described above is operative to transmit each pulse from the source 10 to the lines 16 with precise amplitude fidelity and, after each transmitted pulse reaches its maximum value, the circuit is effectively blocked for a predetermined time sufficient to prevent any subsequent pulse received within that time from adversely affecting the operation of the circuits to be described hereinafter.

From the blocking device 15, the output conductors 16 lead to a cathode follower 23 having a series rheostat 24 and potentiometer 25, and a constant current device 26 connected in its output circuit to maintain a constant output voltage level. Adjustment of the potentiometer 25 provides a threshold control whose function will be described subsequently, the rheostat 24 being a zero adjustment therefor, while the constant current device 26 may comprise a conventional pentode electron tube, for example, arranged in a suitable circuit. The adjustable tap of the potentiometer 25 is coupled to the cathode follower output through a capacitor 27 and to the anode of a diode 28 having its cathode connected to the input of an amplitude-to-time converter 29 which comprises, for example, the well-known Miller run-down circuit or any other conventional arrangement. Within the converter 29 a capacitor 30 is charged through the diode 28 by the circuit described above to a potential proportional to the amplitude of an input pulse and, in order to normally maintain this capacitor at a predetermined potential, the output from the cathode follower 12 is passed through a filter 31 to eliminate all transient components resulting from pulse detection and supplied to a cathode follower 32 coupled to the input circuit of the converter 29 through a series diode 33. Accordingly, by maintaining the voltage at the input circuit of cathode follower 12 at a fixed level, a constant reference voltage is normally supplied to the input circuit of the converter 29. In response to charging of the capacitor 30 above the reference level, the converter 29 generates a pulse of standard amplitude having a duration proportional to the increase in charge of the capacitor and, therefore, representative of the amplitude of a pulse from the source 10.

Another input line 34 to the converter 29 leads through a diode 35 and performs a control function which will be described hereinafter, while the output conductors 36 supply the converter output signals to one input of a conventional coincidence circuit 37, the other input thereto receiving signals from a one megacycle signal generator 38 through a cathode follower 39. Pulse signals from the generator 38 are passed by the coincidence device 37 in response to output signals from the converter 29 and impressed on the control circuit of a fast-acting univibrator 40. Standardized pulses generated thereby corresponding to the input pulses, hereafter called count pulses, are supplied through a cathode follower 41 and appear at its output between a conductor 42 and ground, it being understood that, in certain portions of the circuit to be described hereinafter, various coupling circuits are completed through appropriate ground connections.

One fixed contact 43 of a single pole-double throw switch is connected to the conductor 42, the second fixed contact 44 being connected to the output of the univibrator 18, while the movable arm 45 leads to the input circuit of an integrator 46 arranged to generate a substantially constant voltage output in response to input pulses. Another switch having a movable arm 47 ganged with the arm 45 engages a fixed contact 48 placing a resistor 49 in circuit with the integrator to provide a relatively short time constant when the arm 45 connects the cathode follower output line 42 to the integrator. In the other operating position of the switches, the resistor 49 is removed from the integrator circuit, thereby increasing the time constant for deactivation of the integrator 46 from approximately 20 microseconds to about 100 microseconds, and the movable arm 45 engages the fixed contact 44, thus coupling the input circuit of integrator 46 to the output circuit of the univibrator 18. With this arrangement, each pulse received from the source 10 actuates the integrator 46 through the univibrator 18 and the arm 45 to produce a 100 microsecond blocking pulse. Therefore, in this condition no pulse from the source 10 is passed by the blocking device 15 unless there have been no pulses during the previous 100 microseconds. In both cases, the output signal from the integrator energizes the gate generator 21 to actuate the blocking device 15 through the cathode follower 20, preventing pulses from the source 10 from being received by the system for purposes to be described below.

Referring to Fig. 1B, the output conductor 42 from the cathode follower 41 leads to a pulse amplifier 50, which amplifies the count pulses from the univibrator 40 and applies them to a "flip-flop," or trigger, circuit 51 capable of operating at a frequency of one megacycle per second. In response to these pulses the flip-flop 51 alternately energizes a pair of conductors 52 leading to a units scaler 53 which operates to activate in sequence a group of ten conductors, "0" through "9," coupled to a storage unit 54 in response to successive count signals from the flip-flop 51 as described in detail below. Each time the "9" conductor is deenergized, a cathode follower 55 passes a signal to another flip-flop 56, capable of operating at frequencies up to 100 kilocycles per second, which alternately energizes two lines 57 in response to successive input signals. Changes in energization of the lines 57 actuate a tens address scaler 58 in the same manner as the units scaler, activating in sequence a group of six conductors, for example, labeled "00" through "50" in the illustrated embodiment of the invention to provide a system dividing the range of input pulse amplitudes into fifty-nine separate portions or channels. These conductors also lead to the storage unit 54, described in detail below, to form a matrix with the ten conductors from the units scaler, a group of fifty-nine storage elements being arranged at the intersections thereof to receive signals from the fifty-nine pulse amplitude channels respectively. It will be understood that the invention may be utilized to analyze pulses into any number of amplitude ranges, or channels, by an appropriate increase in the capacity of the scalers and the storage unit.

Returning to the portion of the system illustrated in Fig. 1A, it will be noted that the count pulses on the line 42 from the output of the cathode follower 41 are also supplied to another integrator 60 which is arranged to actuate a store pulse delay device 61. In response to each signal from the integrator, the store pulse delay 61 generates an output pulse which terminates approximately six microseconds after the end of the series of count pulses, thus permitting sufficient time for the scalers 53 and 58 to stabilize at the corresponding address. The trailing edge of this output pulse is detected by a differentiator 62, causing a store pulse generator 63 to fire, producing a twelve microsecond, fifty volt negative store pulse on an output conductor 64 normally maintained at zero potential.

Another output from the store pulse delay leads to a differentiator 65 which responds to the initiation of each signal from the integrator 60 to fire a reset pulse generator 66, supplying a 1.2 microsecond forty-five volt positive reset pulse to an amplifier 67 which inverts the pulse to approximately one hundred fifty volts negative and applies it to a reset line 68. As shown in Fig. 1B, this pulse is carried through four coupling capacitors 69, 70, 71 and 72 to restore the flip-flop circuits 51 and 56 and the scalers 53 and 58, respectively, to the zero condition. Thus, at the beginning of each series of count pulses the address remaining in the scalers from the preceding series is wiped out, preventing the first two pulses in every count series from being registered during the resetting operation. This loss in the count series, however, is compensated in a manner described hereinafter.

Referring to Fig. 2, the units address scaler 53 comprises a magnetron beam switching tube 73 which may, for example, be a Burroughs type MO-10 (6700) tube having a single cathode electrode 74 negatively biased at ninety volts, ten plate electrodes, only four of which 75a, 75b, 75i and 75j are shown, and corresponding grid electrodes 76a, 76b, 76i and 76j associated therewith. In addition, adjacent each plate electrode a deflector, or spade, electrode 77a . . . 77j is positioned to switch the magnetron cathode beam to the corresponding plate electrode as long as the spade receives negative voltage, the entire tube being subject to the influence of a magnetic field in the usual manner. Also, the grid electrodes 76a–76j are capable of switching the cathode beam from one plate to the next in response to signals received from the conductors 52, the odd grids being connected to one conductor and the even grids to the other. Therefore, the cathode beam is stepped from one plate to the next in the series 75a–75j on receipt of each of the alternate signals from the lines 52, causing the output lines "0" to "9" to be energized in sequence. This type of beam switching operation is well known and is described in detail in the U.S. patent to Bethke, No. 2,794,147.

Receipt of a reset pulse through the capacitor 71 drives one cathode 78 of a double diode 79 negative, causing it to conduct through its anode electrode 80, a series resistor 82 which has a capacitor 83 connected in parallel and a common spade resistor 122 connected to ground, lowering the potential of all the spade electrodes 77a through 77j so that the cathode beam is extinguished. Each of the spades 77b–77j is connected through a resistor 81 to the junction of the resistors 82 and 122 while the spade 77a is joined through a like resistor 84 to the anode electrode 80. Thus, at the end of each reset pulse, the potential at the spades 77b–77j rises more rapidly through the resistors 81 than at the spade 77a through the resistors 82 and 84 causing the cathode beam to form on the plate 75a to drive the "0" output conductor from the scaler negatively. Each plate is connected to a positive voltage source through a resistor 85 and to ground through a parallel resistor 86 and diode 87. Actuation of the tenth output conductor "9" also drives another output line 88 negatively and each time the normal positive potential on this line is restored by termination of the cathode beam to the plate electrode 75j, the tens flip-flop 56 is transferred to its opposite condition through the cathode follower 55 shown in Fig. 1B.

Sequential operation of the tens scaler 58 takes place in the same manner as the units scaler 53 in response to signals on the lines 57 from the tens flip-flop 56. In this case, however, the system being limited in the illustrated embodiment to fifty-nine channels, seven plate electrodes of a similar magnetron 89 are utilized, only the last two 90f and 90g being illustrated in Fig. 2, the corresponding grid electrodes 91f and 91g and spade electrodes 92f and 92g being arranged in the same manner as in the magnetron 73. In order to prevent signals from being transmitted to the storage unit 54 before the end of the count pulse series, the output from each of the first six plate electrodes is applied to one input of a coincidence gate, the other input being connected to the store pulse line 64 and the output signal therefrom being carried by the corresponding one of the output conductors "00" . . . "50" to the storage unit. In the example illustrated in Fig. 2, each gate comprises a dual triode 93 having both plate electrodes connected to a positive source, one grid electrode 94 coupled to the plate 90f, the other grid electrode 95 connected to the conductor 64, and its coupled cathodes leading to the output line "50" and to a negative voltage source through a resistor 96. Thus, if only one of the grids 94 and 95 is held negative, the opposite side of the tube conducts through the resistor 96 holding the "50" line at a relatively positive potential. If, however, both grids receive negative signals at the same time, neither side of the tube conducts and the output line is driven to a strongly negative potential.

When the seventh plate electrode 90g in the magnetron 89 is actuated, indicating that the number of count pulses in a particular series exceeds fifty-nine and, therefore, that the corresponding input pulse from the source 10 has an amplitude greater than the range under consideration, a negative signal is applied to a seventh output conductor 97. As illustrated in Figs. 1B and 1A, a surplus univibrator 98 is actuated in response to this signal, sending a pulse back to the amplitude to time converter 29 through the conductor 34 and the diode 35. This signal operates to discharge the capacitor 30, stopping the train of count pulses and thereby unblocking the lines 14 to permit another pulse to be analyzed.

Within the storage unit 54 as shown in Fig. 2, a group of six more identical magnetrons, only the first and last of which 98a and 98f are illustrated, is arranged with their spade electrodes connected to the intersections of the matrix formed by the output conductors from the units and tens scalers 53 and 58. Inasmuch as the intersection of the "0" and "00" conductors bears no useful information, the first magnetron 98a is arranged to store information at the addresses "1" through "10" and succeeding magnetrons are similarly arranged, the last one 98f supplying the addresses "51" through "59." Thus, the first spade 99a of the magnetron 98a is connected through a diode 101 to the "10" conductor, a series resistor 100a being included between the spade and the diodes and another resistor 101a connecting both diodes to a negative voltage source, while the remaining spades 99b–99j are similarly connected to the "1" through "9" conductors, respectively, and to the "00" conductors. In the sixth magnetron 98f, the first spade 102a is grounded, eliminating the sixtieth intersection, the spades 102b through 102j being linked to the "1" to "9" conductors, respectively, and the "50" line.

In order to store pulse amplitude information separately in the various channels, each of the plate electrodes 103 in the storage unit places a unit charge on a corresponding capacitor 104a . . . 104x each time the associated spade electrode is pulsed by simultaneous negative signals from the units and tens scalers, directing the cathode beam to the plate electrode for a fixed time interval. Inasmuch as the charge stored in a capacitor in this manner is substantially independent of the plate voltage over a wide range, a standard charge is applied to the capacitor corresponding to the selected address by the twelve microsecond store pulse regardless of the number of preceding charges already stored therein. Small differences in the cathode current to each of the plate electrodes, which may occur as a result of structural variations in the spade and plate electrodes, can be eliminated by adjusting the value of the spade resistor 100a, which is normally 40,000 ohms.

After any desired period of operating time, the charge on each storage capacitor is determined by testing the potential at the plate side of each capacitor through the conductors 105a . . . 105x of a cable 106 leading to a readout unit 107, shown in Fig. 1B. Activation of this unit by depression of a switch 108 energizes a multivibrator 109 causing a pair of switch arms 110 and 111 to engage in sequence and in unison two series of contacts 112 and 113, respectively, under the influence of a magnet coil 114. Each of the contacts 112 leads one of the conductors of the cable 106, thus connecting the storage capacitors 104a through 104x in sequence through a conventional voltage inverter 115 to the vertical deflection plate 116 of a cathode ray tube 117, for example. At the same time, the arm 111 connects the horizontal deflection plate 118 to increasingly positive taps of a voltage divider 119 through the contacts 113, thus producing a graphical representation of the amplitude distribution of the pulses from the source 10 on the face of the tube 117. After each readout operation, all the storage capacitors may be restored to the "zero" condition, if desired, by closing a switch 120 to apply a standard positive voltage to the arm 110 and again sweeping the contacts 112. If desired, the rate of pulse counting in each amplitude channel may be indicated by shunting each capacitor 104a through 104x by an appropriate high resistance 121 through a switch 123 to the standard positive voltage source, thus causing a voltage to be maintained at each of the conductors 105a through 105x in proportion to the rate at which the amplitude indicating signals in the corresponding channels are received.

In operation, a pulse of the type shown graphically in Fig. 3A, which is to be analyzed according to its amplitude is received by the input amplifier 11 from the source 10 and passed to the cathode follower 12, as shown in Fig. 1A. At the time the pulse reaches its maximum value, indicated in Fig. 3 by the vertical dashed line 125, the univibrator 18 generates a pulse, represented graphically in Fig. 3B, which is applied through the cathode follower 19 and the line 17 to the blocking device 15 to prevent the remainder of the input pulse from being passed through the cathode follower 23 to the amplitude-to-time converter 29. This is represented in Fig. 3C, wherein the potential across the conductors 16 (Fig. 1A) is cut off as long as the blocking device is actuated. In proportion to the amplitude of this pulse, the converter capacitor 30 is charged through the diode 28 to a voltage above the normal level maintained by the diode 33 and discharges at a constant rate as represented by the slant line 128 in Fig. 3C until its potential reaches a threshold level 129. Meanwhile, the converter generates a constant amplitude output signal, shown in Fig. 3D, as long as the capacitor 30 is discharging, permitting the coincidence circuit 37 to pass a series of one microsecond count pulses from the generator 38, as illustrated in Figs. 3E and 3F, the vertical dashed line 130 representing the time at which the capacitor voltage reaches the threshold level.

As described above, the first two count pulses in any series are lost during the resetting of the scalers and compensation for this is obtained by adjusting the potentiometer 25 to lower the threshold level 129 sufficiently to include two extra count pulses in each series. Inasmuch as the rundown slope 128 is approximately one volt per microsecond, the vertical line 130 may be shifted to the right to add two pulses from the series shown in Fig. 3E to the group shown in Fig. 3F, by a decrease of about two volts in the threshold level 129 with respect to the voltage at the peak 126.

As illustrated by Fig. 3G, the positive blocking signal applied to the line 17 is initiated by the univibrator pulse, shown in phantom therein, and is maintained for the duration of the integrator 46 output signal by the gate generator 21, the lines 16 being unblocked thereafter, as indicated by the vertical dashed line 131. This occurs about twenty microseconds after the end of the series of the count pulses when the switch arms 45 and 47 are in the positions illustrated in Fig. 1A or about one hundred microseconds after the input pulse peak 126 or that of any subsequent pulse within one hundred microseconds when the switch is in the other position. The latter arrangement is especially useful for input pulses having a long trailing edge and, in addition, provides a blocking time which is independent of the pulse amplitude and the threshold level 129.

In this manner, the system is effectively blocked from analyzing pulses for a fixed interval of time in response to a pulse to be analyzed as well as to any subsequent pulse within the interval. In other words, the system is rendered sensitive to a pulse in a series of input pulses only if there has been no pulse during the immediately preceding one hundred microseconds. Thus, response to pulses whose amplitudes are effectively distorted by concurrence with the trailing edges of preceding pulses is minimized. This is especially useful in applications requiring relatively long connections between elements 10 and 11 productive of extensive trailing edges, as in the pulse of Fig. 3A. For example, element 10 may be a scintillation type detector of well logging apparatus suspended by a long cable in a borehole drilled into the earth. In such an application, the detector is responsive to naturally-occurring or induced gamma radiation to produce pulses whose amplitudes and time rate of occurrence are representative of gamma ray energies and intensity, respectively, and it is important to minimize the effects of or eliminate pulses whose amplitudes are distorted in order to obtain reliable information concerning the earth formations.

In response to the train of count pulses shown in Fig. 3F, the integrator 60 generates an output signal and decays to its normal condition about six microseconds after the end of the train, as shown in Fig. 3H, energizing the store pulse delay 61 for a corresponding length of time, as illustrated by Fig. 3I. Detection of the beginning and end of this delay signal by the differentiators 65 and 62, respectively, develops the two actuating signals which are represented in Fig. 3J. In response to the first of these, the reset pulse generator 66 supplies a reset signal, shown in Fig. 3K, to the flip-flops and scalers through the line 68 during the first two count pulses as previously described, the second actuating signal firing the store pulse generator 63 at the end of the delay signal to actuate one of the gates in the tens scaler through the line 64, as represented by Fig. 3L.

Referring to Fig. 4, the series of count pulses supplies to the line 42 is illustrated graphically by Fig. 4A, the reset signal being represented by Fig. 4B and the store pulse by Fig. 4C. In response to each reset pulse, the zero output lines of the units flip-flop 51, and the tens flip-flop 56 are driven to a negative potential if not already in that condition, as shown in Figs. 4D and 4F, respectively. At the same time, the "0" conductor in the units scaler output, shown in Fig. 4E, and the plate electrode corresponding to the "00" output in the tens scaler, shown in Fig. 4G, are also driven negatively by the resetting action described above. In the illustrated example, fourteen count pulses are shown in Fig. 4A to represent a pulse in the twelfth amplitude channel, for example, and each one received after the first two transfers the units flip-flop to the opposite condition, stepping the cathode beam in the units scaler to the next higher plate electrode, the resulting negative signals on the output conductors "0"–"9" being illustrated in Fig. 4E. Termination of the "9" conductor signal by the twelfth pulse in the series triggers the tens flip-flop, as shown in Fig. 4F, to restore the "00" plate electrode and activate the "10" plate electrode, as shown in Fig. 4G. At the same time, the "0" conductor is energized again by the units scaler cathode beam and the following two pulses deflect the beam to the third plate to activate the "2" conductor. Thus, since the "10" and "2" plate electrodes are activated at the end of the count pulse train, the address "12" in the storage unit 54 has been selected by the scalers in response to the fourteen count pulses. Receipt of the store pulse shown in Fig. 4C from the line 64 by the tens scaler 58 drives the "10" gate output negatively for twelve microseconds to transmit a store signal through the "10" conductor. The resulting negative pulse at the spade electrode connected to the intersection of the "10" and "2" conductors in the storage unit matrix stores a unit charge in the capacitor at the "12" address.

As described above, the charge stored in the capacitor at each address after any selected period of time represents the number of pulses of corresponding amplitude received during that period from the source 10 and passed by the blocking device 15. Although input pulses received during the time required for analysis of a particular pulse are not processed because of the blocking action, the charges stored in the capacitors during any given period are representative of the amplitude distribution of pulses from the source since the input pulses which are blocked have the same amplitude distribution as those which are analyzed. Accordingly, the determination of the charges on all the capacitors by the readout unit 107 after a selected time interval, or of the rate of charging, in the manner described above presents an accurate analysis of the amplitude distribution of pulses generated by the source 10.

Although the invention has been described herein with reference to a specific embodiment thereof, many modifications and variations therein will occur to those skilled in the art. Accordingly, the invention is not intended to be restricted in scope except as defined by the following claims.

We claim:

1. Apparatus for analyzing a variable amplitude series of pulses to determine their amplitude distribution comprising a plurality of storage elements each corresponding to a selected portion of the amplitude range of the pulses, means responsive to the amplitude of a pulse for selecting the storage element corresponding to the portion of the range including that amplitude, blocking means responsive to one pulse and to any pulse occurring within a selected interval of time following said one pulse for preventing the apparatus from responding to further pulses during a predetermined interval of time, and magnetron beam switching means responsive to the selecting means for storing a unit signal in the corresponding storage element.

2. Apparatus for analyzing a variable amplitude series of pulses to determine their amplitude distribution comprising a plurality of storage elements each corresponding to a selected portion of the amplitude range of the pulses, means responsive to the amplitude of a pulse for selecting the storage element corresponding to the portion of the range including that amplitude, blocking means responsive to one pulse and to any pulse occurring within a selected interval of time following said one pulse for preventing the apparatus from responding to further pulses during a predetermined interval of time, store signal generating means for generating a store signal in response to each pulse, and electron tube means responsive to the selecting means and to the store signal generating means for storing a unit signal in the corresponding storage element.

3. Apparatus for analyzing a variable amplitude series of pulses to determine their amplitude distribution comprising a plurality of capacitors each corresponding to a selected portion of the amplitude range of the pulses, means responsive to the amplitude of a pulse for selecting the capacitor corresponding to the portion of the range including that amplitude, blocking means preventing the apparatus from responding to further pulses during analysis of a pulse, store signal generating means for generating a store signal in respone to each pulse, magnetron beam switching tube means responsive to the selecting means and to the store signal generating means for storing a unit signal in the corresponding capacitor, and readout means for indicating the distribution of the signals stored in the capacitors.

4. Apparatus for analyzing a variable amplitude series of pulses to determine their amplitude distribution comprising a plurality of storage elements each corresponding to a selected portion of the amplitude range of the pulses, means responsive to the amplitude of a pulse for selecting the storage element corresponding to the portion of the range including that amplitude, blocking means preventing the apparatus from responding to further pulses and selectively capable of blocking further pulses for an interval dependent upon the amplitude of the pulse being analyzed or for a fixed time interval after receipt of the analyzed pulse, and magnetron beam switching means responsive to the selecting means for storing a unit signal in the corresponding storage element.

5. Apparatus for analyzing a variable amplitude series of pulses to determine their amplitude distribution comprising a plurality of storage elements each corresponding to a selected portion of the amplitude range of the pulses, means responsive to the amplitude of a pulse for selecting the storage element corresponding to the portion of the range including that amplitude, blocking means preventing the apparatus from responding to further pulses and selectively capable of blocking further pulses for an interval dependent upon the amplitude of the pulse being analyzed or for a fixed time interval after receipt of the analyzed pulse, store signal generating means for generating a store signal in response to each pulse, gate means responsive to the store signal generating means and the selecting means; electron discharge means responsive to the gate means including an anode associated with each storage device and a control electrode for each anode arranged to direct an electron current thereto which is substantially independent of the anode potential in response to each pulse within the corresponding amplitude range, and readout means for indicating the distribution of the signals among all the storage elements.

6. Apparatus according to claim 5 wherein the store signal generating means is responsive to the selecting means to generate a store signal at a predetermined time after the storage element has been selected.

7. Apparatus for analyzing a variable amplitude series of pulses to determine their amplitude distribution comprising a plurality of storage elements each corresponding to a selected portion of the amplitude range of the pulses, means responsive to the amplitude of a pulse for selecting the storage element corresponding to the portion of the range including that amplitude, blocking means preventing the apparatus from responding to a further pulse and selectively capable of blocking further pulses for an interval dependent upon the amplitude of the pulse being analyzed or for a fixed time interval after receipt of the analyzed pulse, store signal generating means for generating a store signal in response to each pulse, gate means responsive to the store signal generating means and the selecting means, magnetron beam switching means responsive to the gate means for storing a unit signal in the corresponding storage element, and readout means for indicating the distribution of signals among all the storage elements.

8. Apparatus for analyzing a variable amplitude series of pulses to determine their amplitude distribution comprising a plurality of storage elements each corresponding to a selected portion of the amplitude range of the pulses, means responsive to the amplitude of a pulse for selecting the storage element corresponding to the portion of the range including that amplitude, and electron discharge means responsive to the selecting means including an anode associated with each storage device and a control electrode for each anode arranged to direct an electron current thereto which is substantially independent of the anode potential in response to each pulse within the corresponding amplitude range.

9. Apparatus for analyzing a variable amplitude series of pulses to determine their amplitude distribution comprising a plurality of storage elements each corresponding to a selected portion of the amplitude range of the pulses, means responsive to the amplitude of a pulse for selecting the storage element corresponding to the portion of the range including that amplitude, store signal generating means for generating a store signal in response to each pulse, and electron discharge means responsive to the selecting means and to the store signal generating means including an anode associated with each storage device and a control electrode for each anode arranged to direct an electron current thereto which is substantially independent of the anode potential in response to the store signal for each pulse in the corresponding amplitude range.

10. In apparatus for determining the amplitude distribution of a variable amplitude series of pulses including a plurality of storage units each corresponding to a selected portion of the amplitude range of the pulses, means for storing a unit signal in a selected storage element comprising an electron discharge device including a cathode electrode, an anode electrode coupled to the storage element, and a control electrode adapted to direct an electron current which is substantially independent of the anode electrode potential from the cathode electrode to the anode electrode.

11. In apparatus for determining the amplitude distribution of a variable amplitude series of pulses including a plurality of storage elements each corresponding to a selected portion of the amplitude range of the pulses, means for storing a unit signal in a selected storage element comprising an electron discharge device including a cathode electrode, an anode electrode coupled to the storage element, and a control electrode adapted to direct an electron current which is substantially independent of the anode electrode potential from the cathode electrode to the anode electrode, and means for actuating the control electrode for a predetermined time in response to a pulse having an amplitude within the portion of a range corresponding to the associated storage element.

12. Apparatus according to claim 11 wherein the means for storing a unit signal comprises a magnetron beam switching device.

References Cited in the file of this patent
UNITED STATES PATENTS

| | | |
|---|---|---|
| 2,454,780 | Deakin | Nov. 30, 1948 |
| 2,730,694 | Williamson | Jan. 10, 1956 |
| 2,802,200 | Schafer | Aug. 6, 1957 |
| 2,843,839 | Cunningham | July 15, 1958 |